United States Patent Office 2,857,414
Patented Oct. 21, 1958

2,857,414
PREPARATION OF PARTIALLY SUBSTITUTED SILANES AND SILANE

Hans Werner Schmidt, Hannover-Kirchrode, and Herbert Jenkner, Hannover, Germany, assignors to Kali-Chemie Aktiengesellschaft, Hannover, Germany No Drawing. Application September 16, 1955
Serial No. 534,876

Claims priority, application Germany September 18, 1954

5 Claims. (Cl. 260—448.2)

The invention relates to the preparation of organosilicon compounds and silanes.

It is a principal object of the invention to provide a method for the preparation of organosilicon compounds which have at least one hydrogen atom directly bound to the silicon atom.

According to the invention, organo-aluminum hydrides are reacted with silicon compounds. Suitable organo-aluminum hydrides are, for instance, alkyl aluminum hydrides such as diethyl aluminum hydride or diisobutyl aluminum hydride.

Suitable silicon compounds are for instance silicon halides, particularly silicon tetrafluoride, complex silicon fluorides, silicic esters, and compounds which contain at least one Si—C bond in addition to halogen and/or alkoxy groups, such as alkyl siliconhalides of the formula $SiHal_xR_y$ (R=alkyl; $x+y=4$), alkyl silicic esters or alkoxides and the like.

The reaction is carried out at temperatures of about 20–260° C. and proceeds, for instance for dialkyl aluminum hydride and dialkyl silicon difluoride according to the equation (1) 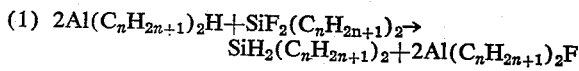
$$2Al(C_nH_{2n+1})_2H + SiF_2(C_nH_{2n+1})_2 \rightarrow SiH_2(C_nH_{2n+1})_2 + 2Al(C_nH_{2n+1})_2F$$

The reaction described may, of course, also be used to further hydrogenate silicon compounds which already contain Si—H linkages but have still reactive groups directly attached to the silicon atom.

The reaction may be carried out in the presence or absence of solvents, suspending or diluting agents, and at atmospheric or elevated pressure.

The following examples are given to illustrate preferred modes of carrying out the invention, it being understood that the invention is not to be limited to the details given herein. All parts are given by weight.

Example 1

55 parts by weight of silicontetrafluoride were added to 74 parts by weight of 80% diethyl aluminum hydride (rest triethyl aluminum) in an iron pressure vessel. The temperature was increased up to 260° within one hour; then the mixture was distilled. The products of distillation consisted of the following fractions:

Fraction 1: 16.8% with a hydride content of 21%
Fraction 2: 24% with a hydride content of 43%
Fraction 3: 38% with a hydride content of 47%
Fraction 4: 21.2% tetraethylsilane

Example 2

29.6 parts by weight of triethylfluorosilane were dropped to 19 parts by weight of diethyl aluminum hydride under stirring at room temperature and under normal pressure. The exothermic reaction began immediately and was finished in about one hour. The yield was quantitative and consisted of 25.6 parts by weight of triethylsilane and diethyl aluminum fluoride. Di-isobutyl aluminum hydride instead of diethyl aluminum hydride reacted in the same manner.

Example 3

14.3 parts by weight of dimethyldichlorosilane were added to 19 parts by weight of diethyl aluminum hydride according to Example 2. The reaction was exothermic and gave in an almost quantitative yield a mixture of dimethylsilane and dimethylchlorosilane (about 80:20%). If instead of dimethyldichlorosilane dimethyldiethoxysilane, diethyldiethoxysilane or other alkyl silicon esters were used, the yield of the exothermic reaction was quantitative. Under the same conditions, di-isobutyl aluminum hydride can be used instead of diethyl aluminum hydride. If instead of alkylsiliconesters silicon esters were reacted with diethyl aluminum hydride or di-isobutyl aluminum hydride, silanes in more than 80% yield were obtained.

Example 4

114 parts (1 mole) of triethyl aluminum were mixed with 282 parts (1.5 moles) of sodium fluosilicate and heated in an iron pressure vessel. An exothermic reaction started at 200–220° C. The $SiF_2R_2$ fraction of the reaction products had a content of only 10.5% of $SiH_2R_2$.

If $Al(C_2H_5)_3$ was replaced according to the invention by $AlH(C_2H_5)_2$, the yield of hydrosilicon compounds was increased by 10–20%.

We claim:

1. A process for the preparation of silicon compounds of the formula

$$SiH_xX_yY_z$$

wherein X and Y are members of the group consisting of alkyl, alkoxy, and halogen, $x$ is an integer from 1 to 4, $y$ and $z$ are integers from 0 to 3, and $x+y+z=4$, comprising heating a lower dialkyl aluminum hydride at a temperature of about 20 to 260° C. with a silicon compound selected from the group consisting of silicon halides, sodium fluosilicate, silicon alkoxides, and silicon compounds of the formula

$$SiHal_aAlk_bR_c$$

wherein Hal is halogen, Alk is alkoxy, R is alkyl, $a$ and $b$ each are integers from 0 to 3, $c$ is an integer from 1 to 3, and $a+b+c$ is 4, and distilling off the obtained $SiH_xX_yY_z$ compounds.

2. The process defined in claim 1 wherein a dialkyl aluminum hydride is employed, the alkyl groups of which have 2 to 4 C atoms 3. The process defined in claim 1 wherein the dialkyl aluminum hydride is diethyl aluminum hydride and the silicon compound is sodium fluosilicate.

4. The process which comprises contacting a lower dialkyl aluminum hydride with a methyl halosilane at a temperature of about 20° C., thereby producing an exothermic reaction replacement of the halogen of said methylhalosilane by hydrogen.

5. The process which comprises contacting a lower dialkyl aluminum hydride with an ethyl halosilane at a temperature of about 20° C., thereby producing an exothermic reaction replacement of the halogen of said ethyl halosilane by hydrogen.

References Cited in the file of this patent

UNITED STATES PATENTS

| 2,403,370 | Hurd | July 2, 1946 |
| 2,567,972 | Schlesinger et al. | Sept. 18, 1951 |

FOREIGN PATENTS

| 888,852 | Germany | Sept. 7, 1953 |
| 908,019 | Germany | Apr. 1, 1954 |

OTHER REFERENCES

Hurd: "Am. Chem. Soc., Journal," vol. 67 (1945), pages 1545–1549.